United States Patent [19]
Sakamaki

[11] Patent Number: 6,107,372
[45] Date of Patent: Aug. 22, 2000

[54] RUBBER COMPOSITION FOR THE TIRE HAVING IMPROVED ABRASION RESISTANCE AND AGING RESISTANCE

[75] Inventor: Yoshiaki Sakamaki, Hiratsuka, Japan

[73] Assignee: The Yokohama Rubber Co., Ltd., Tokyo, Japan

[21] Appl. No.: 09/097,052

[22] Filed: Jun. 15, 1998

[30] Foreign Application Priority Data

Jun. 17, 1997 [JP] Japan ..................................... 9-160001
Apr. 27, 1998 [JP] Japan ................................. 10-117345

[51] Int. Cl.⁷ .................................. C08L 5/00; C08L 9/00
[52] U.S. Cl. .................................. 524/56; 524/57; 524/58
[58] Field of Search ................................. 524/47, 48, 49, 524/50, 51, 52, 53, 54, 55, 56, 57, 58

[56] References Cited

U.S. PATENT DOCUMENTS

| | | | |
|---|---|---|---|
| 5,115,001 | 5/1992 | Beckmann | 524/58 |
| 5,218,020 | 6/1993 | Tung et al. | 524/58 |
| 5,650,454 | 7/1997 | Hoover et al. | 524/47 |
| 5,672,639 | 9/1997 | Corvasce et al. | 524/52 |
| 5,717,022 | 2/1998 | Beckmann et al. | 524/495 |

FOREIGN PATENT DOCUMENTS

| | | | |
|---|---|---|---|
| 74546 | 7/1978 | Japan | 524/56 |
| 97341 | 5/1986 | Japan | 524/58 |

OTHER PUBLICATIONS

Grant & Hackh's Chemical Dictionary, Fifth Edition, McGraw–Hill, p. 514, 1987.
Hawley's Condensed Chemical Dictionary Twelfth Edition, Van Nostrand–Reinhold p. 1017, 1993.

*Primary Examiner*—Peter A. Szekely
*Attorney, Agent, or Firm*—Arent Fox Kintner Plotkin & Kahn, PLLC

[57] ABSTRACT

A rubber composition for a tire tread or side wall or for an organic fiber reinforcing layer of a tire contains (i) 100 parts by weight of a diene rubber;
(ii) 0.1–10 parts by weight of a sugar and
(iii), optionally, 35–100 parts by weight of a reinforcing filler.

3 Claims, 1 Drawing Sheet ative mineral oils or vegetable oils, and, further, various
additives generally used for a rubber composition, for
example, vulcanization agents such as sulfur, vulcanization
accelerators, antioxidants, softening agents such as various
mineral oils or vegetable oils, fillers, plasticizers, tackifiers,
coupling agents, and the like.

RUBBER COMPOSITION FOR THE TIRE HAVING IMPROVED ABRASION RESISTANCE AND AGING RESISTANCE

BACKGROUND OF THE INVENTION

1. Field of the Invention

The present invention relates to a rubber composition for a tire. More specifically, it relates to a rubber composition suitable for use as a tire tread, a tire side wall, or an organic fiber reinforcing layer of a tire, having an improved abrasion resistance and aging resistance, without impairing the properties at break, the wet grip property, the heat generation, and the processability of the rubber composition.

2. Description of the Related Art

In the past, as a means for improving the abrasion resistance of rubber compositions, the blending with polybutadiene rubber, the use of carbon black having a small particle size, the use of EV (i.e., effective vulcanization) or semi EV type vulcanization accelerator, etc. have been proposed, there are problems in these proposals that the characteristics at break, the wet grip property and the heat generation are impaired. In addition, it has been proposed to formulate L-ascorbic acid (i.e., vitamin C) in a rubber composition for a tire, but there is a problem in this proposal that the processability is decreased due to the faster scorching (i.e., premature curing or burning) of the rubber composition.

Furthermore, as a means for improving the aging resistance of a rubber composition for a tire, the formulation of an antioxidant (or aging resistor) such as an amine antioxidant, a phenol antioxidant or the like into the rubber composition has been used. However, when these antioxidants are formulated, there are problems that the outer appearance is impaired due to the blooming and that, in the case of an amine antioxidant, the odor (i.e., amine odor) is generated.

SUMMARY OF THE INVENTION

Accordingly, the objects of the present invention are to eliminate the above-mentioned problems of the prior art and to provide a rubber composition, which is suitable for use as a tire for a tire tread, a tire side wall, or an organic fiber reinforcing layer of a tire, having an improved abrasion resistance and aging resistance, without impairing the properties at break, the wet grip property, the heat generation etc. and the processability of the rubber composition.

Other objects and advantages of the present invention will be apparent from the following description.

In accordance with the present invention, there is provided a rubber composition for a tire tread or side wall comprising:

(i) 100 parts by weight of at least one diene rubber; and
(ii) 0.1–10 parts by weight of at least one sugar selected from the group consisting of monosaccharides, polysaccharides and the derivatives thereof.

In accordance with the present invention, there is also provided a rubber composition for an organic fiber reinforcing layer of a tire comprising:

(i) 100 parts by weight of at least one diene rubber; and
(ii) 0.1–10 parts by weight of at least one sugar selected from the group consisting of monosaccharides, polysaccharides and the derivatives thereof.

BRIEF DESCRIPTION OF THE DRAWINGS

The present invention will be better understood from the description set forth below with reference to the accompanying drawing of FIG. 1, in which the conditions of the peeling test of the ply between the rubber/cord composite in Examples 10–13 and Comparative Example 4 are schematically shown, in which the numeral reference 1 represents a cord, 2 represents a unvulcanized rubber sheet and 3 represents a cord/rubber composite.

DESCRIPTION OF PREFERRED EMBODIMENT

Figure 1:
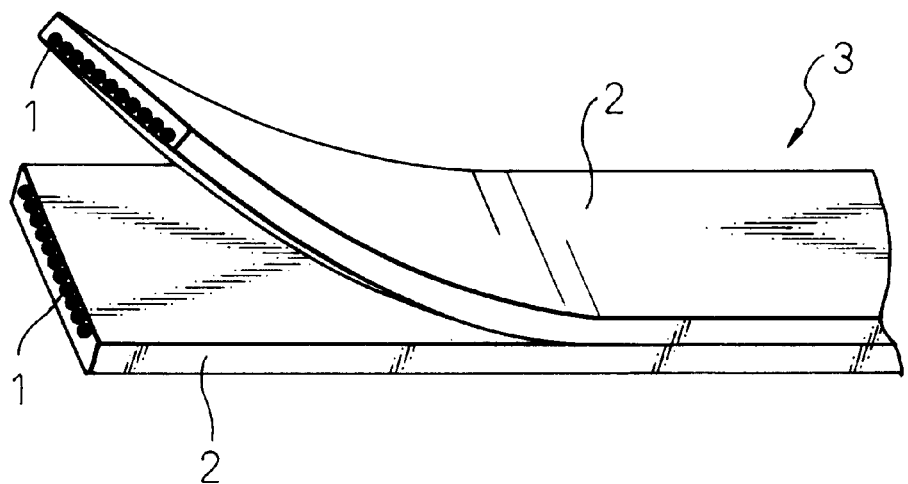

The diene rubber usable in the rubber composition according to the present invention may include any diene rubber conventionally used as a rubber for a tire, alone or in any blend thereof. Examples of such a rubber are natural rubber (NR), polyisoprene rubber (IR), various styrene-butadiene copolymer rubber (SBR), various butadiene rubber (BR), acrylonitrile-butadiene copolymer rubber (NBR) and butyl rubber (IIR).

Sugars usable in the present invention include, for example, monosaccharides such as D-glucose, D-fructose, D-xylose, D-galactose, L-galactose, D-mannose; polysaccharides including disaccharides or higher such as maltose, lactose, sucrose, cellobiose, stachyose, starch, agar, raffinose (i.e., blackstrap molasses), maltotriose; and the derivatives thereof such as sugar alcohols, deoxy-sugars, amino sugars, glycosides, uronic acids, esters of sugars and fatty acids, and the like. It should be noted that the term "polysaccharides including disaccharide or higher" means sugars formed by the condensation of two or more molecules of monosaccharides.

Among the above-mentioned sugars, those having a reducing property and those not having a reducing property but polysaccharides including disaccharides or higher formed by the condensation of two or more molecules of monosaccharides having a reducing property are particularly preferably used in the present invention due to the large advantageous effects or results obtained therefrom. The term "reducing property" used herein means that a certain sugar is capable of reducing a Fehling's solution.

The above-mentioned sugars are formulated in the rubber composition in an amount of 0.1 to 10 parts by weight, preferably 0.1 to 5 parts by weight, based on 100 parts by weight of the diene rubber. If the amount of the sugar is too large, the possible formation of poorly dispersed mass in the resultant rubber composition unpreferably occurs. Contrary to this, the amount of the sugar is too small, the expected advantageous effects or results are unpreferably insufficient.

The formulation method of sugars into a rubber composition are known in the art, as disclosed in, for example, JP-A-53-74546, JP-A-57-212243, JP-A-3-39339, JP-A-7-118457. However, although JP-A-7-118457, for example, discloses the incorporation of carbohydrates into a rubber for the purpose of improving the adhesion with a steel cord, there are no teachings therein to improve the abrasion resistance and the aging resistance. This is also true in the other references.

The rubber composition according to the present invention may contain a reinforcing filler such as carbon black and silica conventionally used in the rubber composition. These reinforcing fillers may be used alone or in any mixture thereof. The amount of the reinforcing filler when used is preferably 35 to 150 parts by weight, based upon 100 parts by weight of the rubber.

The rubber composition according to the present invention may further contain, in addition to the above-mentioned essential ingredients, various additives generally formulated for tire use, for example, vulcanization agents such as sulfur, vulcanization accelerators, softening agents such as various types of oils, antioxidants, fillers, etc. These additives may be mixed and vulcanized by general methods to form a composition and used for vulcanization. The amounts of these additives compounded may be those conventionally used in the past so long as they do not adversely affect to the objects of the present invention. The resultant rubber compositions are used for the manufacture of tires conventional mixing and vulcanization methods.

EXAMPLES

The present invention will now be explained by but by no means limited to, the following Examples and Comparative Examples.

Examples 1–9 and Comparative Examples 1–3

The ingredients except for the vulcanization accelerator and sulfur of the formulation (parts by weight) shown in Table I were mixed in 1.8 liter closed type mixer for 3 to 5 minutes. The mixture (i.e., master batch) was discharged when the temperature of the mixture reaches 165±5° C. The vulcanization accelerator and the sulfur were mixed with this master batch by an 8-inch open roll to obtain the rubber composition.

Then, the composition was pressed and vulcanized at 160° C. for 20 minutes to prepare the desired test piece (rubber sheet). This was used for the measurement and evaluation mentioned below. The results are shown in Table I.

The test methods for the vulcanized physical properties of the compositions obtained in the Examples were as follows:

Abrasion resistance: The abrasion loss was measured by a method according to a Lambourn abrasion defined JIS (i.e., Japanese Industrial Standards)-K-6264 using a Lambourn abrasion tester (made by Iwamoto Seisakusho) under conditions of a temperature of 20° C. and a slip rate of 50%. The values were indexed to Comparative Example 1 as 100. The larger the value, the better the abrasion resistance.

Property at break: The tensile strength and elongation at break were determined according to a method of JIS-K-6301. The larger the values, the better the properties.

Wet grip: Tan δ was measured at 0° C. using a viscoelasticity spectrometer (made by Toyo Seiki) under conditions of a strain rate of 10%±2%, and a frequency of 20 Hz. The larger the values, the better the wet grip.

Heat generation: Tan δ was measured at 60° C. using a viscoelasticity spectrometer (made by Toyo Seiki) under conditions of a strain rate of 10%±2% and a frequency of 20 Hz. The smaller the values, the better the results.

Dispersibility: The vulcanized rubber sheet was cut with a sharp cutter and the number of the poorly dispersed mass with sugar having a diameter of 0.1 mm or more present per 1 $cm^2$ cut area was counted. The results were evaluated as follows.

| Evaluation | Number of mass |
|---|---|
| ○ (Good) | 1 or less |
| Δ (Fair) | 2–3 |
| x (Poor) | 4 or more |

Elastic Property: 100% modulus was determined by a tensile test at room temperature according to a method of JIS-K-6251 (3 dumbbell used).

Scorching: The time period for increasing the viscosity of 5 Mooney units at 125° C. was determined according to a method of JIS-K-6300. The larger the values, the better the results.

The results are shown in Table I below.

TABLE I

| | Example | | | | | |
|---|---|---|---|---|---|---|
| Formulation and Property | 1 | 2 | 3 | 4 | 5 | 6 |
| Oil extended SBR[1] | 137.50 | 137.50 | 137.50 | 137.50 | 137.50 | 137.50 |
| Carbon black (HAF) | 80.00 | 80.00 | 80.00 | 80.00 | 80.00 | 80.00 |
| Stearic acid | 1.00 | 1.00 | 1.00 | 1.00 | 1.00 | 1.00 |
| Zinc oxide | 2.00 | 2.00 | 2.00 | 2.00 | 2.00 | 2.00 |
| Process oil | 12.50 | 12.50 | 12.50 | 12.50 | 12.50 | 12.50 |
| Sucrose | 0.10 | 0.50 | 2.00 | 5.00 | 8.00 | 10.00 |
| Glucose | — | — | — | — | — | — |
| Maltose | — | — | — | — | — | — |
| Inositol | — | — | — | — | — | — |
| Vitamin C | — | — | — | — | — | — |
| Vulcanization accelerator[2] | 1.50 | 1.50 | 1.50 | 1.50 | 1.50 | 1.50 |
| Sulfur | 2.50 | 2.50 | 2.50 | 2.50 | 2.50 | 2.50 |
| Abrasion resistance: Lambourn abrasion (Index) | 1.08 | 1.12 | 1.25 | 1.44 | 1.80 | 1.64 |
| Anti-aging property: Thermal aging test Change in crosslinking density[3] | 0.80 | 0.72 | 0.63 | 0.45 | 0.35 | 0.30 |
| Elastic Property 100% Modulus (MPa) | 23.8 | 23.4 | 22.3 | 20.5 | 16.1 | 12.9 |
| Property at break: | | | | | | |
| Strength at break (MPa) | 19.8 | 19.5 | 19.3 | 18.7 | 18.3 | 18.0 |
| Elongation at break (%) | 540 | 577 | 643 | 680 | 690 | 697 |
| WET Grip: tan δ (0° C.) | 0.52 | 0.52 | 0.51 | 0.51 | 0.52 | 0.52 |
| Heat generation: tan δ (60° C.) | 0.33 | 0.33 | 0.33 | 0.33 | 0.34 | 0.34 |
| Dispersibility: | ○ | ○ | ○ | ○ | Δ | Δ |
| Scorch: 5 Mooney Up (125° C.) (min) | 23 | 23 | 22 | 22 | 21 | 21 |

TABLE I-continued

|  | Example | | | Comparative Example | | |
| --- | --- | --- | --- | --- | --- | --- |
| Formulation and Property | 7 | 8 | 9 | 1 | 2 | 3 |
| Oil extended SBR*[1] | 137.50 | 137.50 | 137.50 | 137.50 | 137.50 | 137.50 |
| Carbon black (HAF) | 80.00 | 80.00 | 80.00 | 80.00 | 80.00 | 80.00 |
| Stearic acid | 1.00 | 1.00 | 1.00 | 1.00 | 1.00 | 1.00 |
| Zinc oxide | 2.00 | 2.00 | 2.00 | 2.00 | 2.00 | 2.00 |
| Process oil | 12.50 | 12.50 | 12.50 | 12.50 | 12.50 | 12.50 |
| Sucrose | — | — | — | — | 16.00 | — |
| Glucose | 5.00 | — | — | — | — | — |
| Maltose | — | 5.00 | — | — | — | — |
| Inositol | — | — | 5.00 | — | — | — |
| Vitamin C | — | — | — | — | — | 5.00 |
| Vulcanization accelerator*[2] | 1.50 | 1.50 | 1.50 | 1.50 | 1.50 | 1.50 |
| Sulfur | 2.50 | 2.50 | 2.50 | 2.50 | 2.50 | 2.50 |
| Abrasion resistance: Lambourn abrasion (Index) | 1.45 | 1.44 | 1.03 | 1.00 | 1.60 | 1.40 |
| Anti-aging property: Thermal aging test Change in crosslinking density*3 | 0.45 | 0.45 | 0.85 | 0.85 | 0.30 | 0.43 |
| Elastic Property 100% Modulus (MPa) | 20.3 | 20.6 | 24.1 | 24.0 | 8.0 | 20.0 |
| Property at break: | | | | | | |
| Strength at break (MPa) | 18.5 | 18.7 | 20.5 | 20.6 | 17.0 | 18.5 |
| Elongation at break (%) | 683 | 678 | 529 | 530 | 680 | 663 |
| WET Grip: tan δ (0° C.) | 0.52 | 0.51 | 0.52 | 0.52 | 0.52 | 0.52 |
| Heat generation: tan δ (60° C.) | 0.34 | 0.33 | 0.34 | 0.34 | 0.34 | 0.34 |
| Dispersibility: | ○ | ○ | ○ | ○ | x | ○ |
| Scorch: 5 Mooney Up (125° C.) (min) | 15 | 18 | 24 | 23 | 20 | 13 |

*[1]: Nipol 9520 (SBR made by Nippon Zeon) (Amount of extended oil: 37.5 wt. parts)
*[2]: N-cyclohexyl-2-benzothiazyl sulfenamide, diphenylguanidine mixture
*[3]: Difference in crosslinking densities between before and after aging at 70° C. for 14 days ($10^{-4}$ mol/cc)

As is clear from the results of Examples 1–9 and Comparative Examples 1–3, according to the present invention, the abrasion resistance and aging resistance are improved, without impairing the characteristics such as the properties at break, the wet grip and the heat generation. When Examples 4, 7 and 8 are compared with Comparative Example 3 (i.e., conventional example), in which vitamin C is formulated, the abrasion resistance and the aging resistance are similar to each other, but the processability (i.e. scorching) of Examples 4, 7 and 8 is better than that of Comparative Example 3.

Accordingly, according to the present invention, the rubber compositions having the improved abrasion resistance and aging resistance are obtained without impairing the characteristics such as the properties at break, the wet grip, the heat generation and further without impairing the processability (i.e., scorching), and therefore, are useful as the rubber compositions for a tire tread and tire side.

From the results of Examples 1–6 and Comparative Examples 1–2 in which the formulated amount of the sugar is changed, when the amount of the sugar is more than 10 parts by weight, the properties at break and the dispersibility are remarkably decreased, the amount of 0.1–10 parts by weight is suitably used and the amount of 0.1–5 parts by weight exhibiting relatively low decrease in the elastic property and dispersibility is preferably used.

When compared with Example 9, in which inositol having no reducing property of a Fehling's solution is formulated, Examples 7 and 8 containing glucose and maltose both having the reducing property show the largely improved abrasion resistance. Furthermore, Example 4 containing sucrose, which does not have a reducing property, but is a condensation product of reducing monosaccharide shows the high abrasion resistance comparable to those of Examples 7 and 8. This is believed that the non-reducing condensation product of a reducing monosaccharide has a potential reducing property. Thus, those having a reducing property and polysaccharides including disaccharides or higher, which does not exhibiting a reducing property but obtained by the condensation of a reducing monosaccharide are preferable due to the high advantageous results thereof. Especially, the latter (i.e., Example 4) is better than the former (Examples 7 and 8) because the latter show the higher scorching, i.e., better processability.

Examples 10–13 and Comparative Example 4

The ingredients except for the vulcanization accelerator and sulfur of the formulation (parts by weight) shown in Table II were mixed in a 1.8 liter closed type mixer for 3 to 5 minutes. The mixture (i.e., master batch) was discharged when the temperature of the mixture reaches 165±5° C. The vulcanization accelerator and the sulfur wear mixed with this master batch by an 8-inch open roll to obtain the rubber composition.

Then, the composition was pressed and vulcanized in a 15×15×0.2 cm mold at 160° C. for 20 minutes to prepare the desired test piece (rubber sheet). This was used for the evaluation of adhesion property after aging. The results are shown in Table II. The test method of the adhesion property after aging was as follows.

The change of the adhesion property between an organic fiber and a rubber before and after the aging was evaluated by the peeling forces before and after aging. That is, as shown in FIG. 1, 30 cords of polyester cord 1 (1500 d/2, 40×40 times/10 cm) previously dip treated for the adhesion were arranged, 1 as one set at a 25 mm wide and embedded in a sheet 2 composed of the above unvulcanized rubber composition. The two plies of the sheet 2 were closely contacted and vulcanized to obtain a rubber/cord composite 3. The resultant composite 3 was used for the meansmeant of the peeling force when the peeling was carried out between the plies in a peeling test or, as shown in FIG. 1, at a rate of 50 mm/min. After aging the sample at 70° C. for 14 days, the peeling force was determined in the same manner as mentioned above. The change in the peeling force was shown by the peeling force after aging when the initial peeling force is made 1. The larger the values, the better the results. The results are shown in Table II.

As is clear from the results shown in Table II, the adhesion property after aging is improved by the addition of a sugar.

As explained above, according to the present invention, a rubber composition having an improved abrasion resistance and aging resistance, without impairing the properties at break, the wet grip property, the heat generation, and the processability (scorching) of the rubber composition can be obtained, and therefore, the resultant rubber composition is useful as those for a tire tread, a tire side wall, or an organic fiber reinforcing layer of a tire.

TABLE II

| Formulation and property | Example | | | | Comparative Example |
|---|---|---|---|---|---|
| | 10 | 11 | 12 | 13 | 4 |
| NR | 60 | 60 | 60 | 60 | 60 |
| SBR | 40 | 40 | 40 | 40 | 40 |
| Zinc oxide | 4 | 4 | 4 | 4 | 4 |
| Stearic acid | 1.5 | 1.5 | 1.5 | 1.5 | 1.5 |
| Antioxidant | 1 | 1 | 1 | 1 | 1 |
| Carbon black | 60 | 60 | 60 | 60 | 60 |
| Process oil | 8 | 8 | 8 | 8 | 8 |
| Sucrose | 0.1 | 0.5 | 2 | 10 | — |
| Vulcanization accelerator | 1.5 | 1.5 | 1.5 | 1.5 | 1.5 |
| Sulfur | 3 | 3 | 3 | 3 | 3 |
| Adhesion property after aging (Rate of change in peeling force*) | 0.77 | 0.79 | 0.8 | 0.83 | 0.75 |

*Rate of change in peeling force before and after aging at 70° C. for 14 days in a gear oven.

I claim:

1. A rubber composition for a tire tread, side wall or an organic fiber reinforcing layer of a tire comprising:
   (i) 100 parts by weight of at least one diene rubber; and
   (ii) 0.1–10 parts by weight of at least one disaccharide obtained by condensation of a monosaccharide having a reducing property, said disaccharide not a reducing material.

2. A rubber composition according to claim 1, wherein said disaccharide is sucrose.

3. A rubber composition according to claim 1, further comprising 35–100 parts by weight of a reinforcing filler, based upon 100 parts by weight of the diene rubber.

* * * * *